Sept. 16, 1952     B. E. LONG, JR     2,610,514
SHEAVE
Filed July 22, 1948
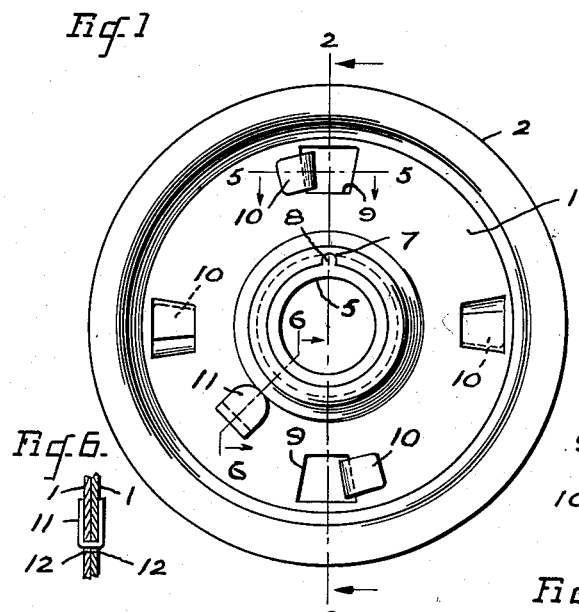
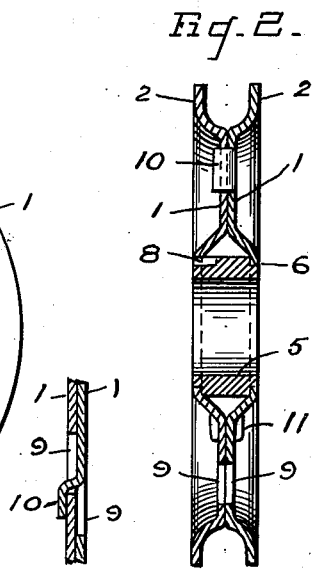
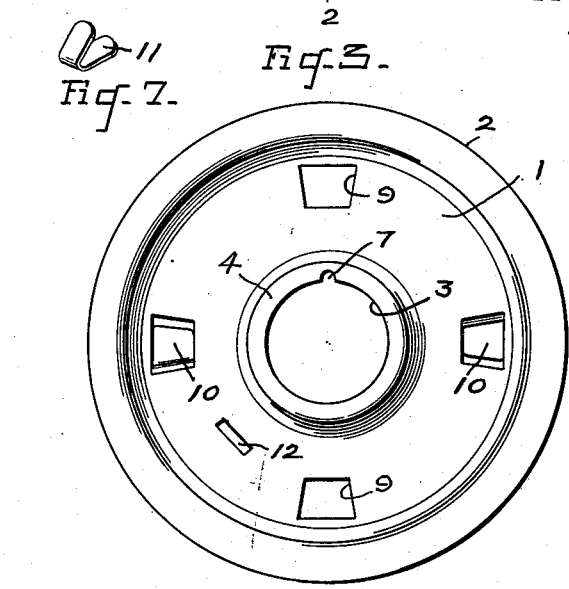
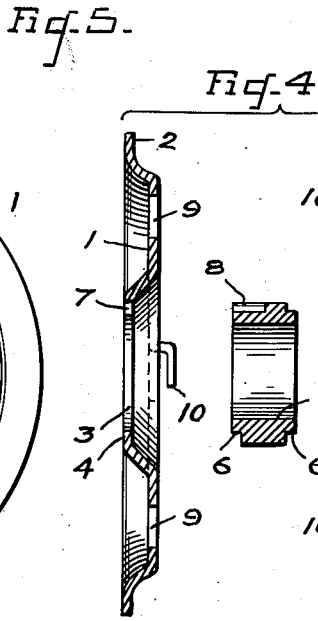
INVENTOR.
BALLARD E. LONG, JR.
BY
Cyrus Kehr & Sweeker Patented Sept. 16, 1952

2,610,514

UNITED STATES PATENT OFFICE 2,610,514

SHEAVE

Ballard Emerson Long, Jr., Knoxville, Tenn.

Application July 22, 1948, Serial No. 40,065

4 Claims. (Cl. 74—230.8)

This invention relates to improvements in sheaves, particularly of the character adapted to be journaled on a bearing or shaft, such as are used frequently in textile mills, as guiding sheaves for belts.

Because of the high speed of operation of such sheaves, the bushing contained therein and which is mounted on the journal or shaft, wears out at frequent intervals, even though constructed of bronze and self-lubricated. It has been the practice heretofore to form such sheaves with plastic bodies, but when the bushing wears so as to render it unsuitable for further service, it has been necessary to replace the sheave in its entirety, the body being destroyed as unfit for further use, because no satisfactory provision has been made for replacing the bushing therein.

One object of this invention is to improve the construction of sheaves for this purpose, to provide them for separable replaceable bushings, which may be replaced when worn without the necessity for destroying the body of the sheave.

A further object of the invention is to provide a sectional sheave so constructed of parts that are interconnected, whereby these may be assembled readily and accurately and will be retained securely in interconnected relation, and yet may be separated for replacement of one or more parts thereof, without destroying the other parts of the sheave.

These objects may be accomplished, according to one embodiment of the invention, by constructing the body of the sheaves of separate sections detachably and interconnected together, which are assembled with a separate bushing therein, that is retained in place by the sections and is also interconnected with one of them as not to interfere with the proper assembly of the sections, whereby the bushing may be replaced when it becomes worn without the necessity for destroying the body of the sheave.

It is preferred that inter-engaged hook connections or bayonet joints be provided between the sections to facilitate the assembly and disassembly thereof and to insure that these will be locked in secure relation to each other and to hold the bushing in place without danger of a twisting force applied to the sheave, causing a disengagement of the sections. This interconnection is not prevented by the attachment of the bushing because the latter is connected by a key to one of the sections to permit relative rotation of the sections. These parts are locked effectively in place but are capable of ready disassembly.

This embodiment of the invention is illustrated in the accompanying drawings in which:

Fig. 1 is a side elevation of the assembled sheave;

Fig. 2 is a cross section therethrough on the line 2—2 in Fig. 1;

Fig. 3 is a side elevation of one of the sheave sections detached;

Fig. 4 is a disassembled cross section through the parts of the sheave;

Fig. 5 is a detail cross section through one of the interlocking connections on the line 5—5 in Fig. 1;

Fig. 6 is a similar view through the locking key, on the line 6—6 in Fig. 1; and Fig. 7 is a perspective view of the key detached.

The sheave is composed essentially of a body and a separate bushing, which bushing is adapted to be replaced when it becomes worn.

The body is shown in the form of two sections 1, illustrated more in detail in Figs. 3 and 4. Each section is preferably stamped from sheet metal, such as aluminum or other suitable material which facilitates the construction thereof, in an inexpensive manner. Each body section 1 has an outwardly flaring edge portion 2, which flaring edge portion cooperates to form a groove in the periphery of the pulley when the sections are assembled in side-by-side relation as shown in Fig. 2.

The body sections 1 are also provided with center holes 3 therein, the surrounding edges 4 of which holes 3 are substantially in the planes of the flaring edges 2, being flared laterally with respect to the major portions of the body sections 1, to be disposed in spaced relation when these sections are assembled as illustrated in Fig. 2.

A center bushing is generally designated at 5, and usually is formed of bronze of the character known as "Oilite," having a sufficient lubricant contained in the metal thereof to lubricate the bushing in service. The bushing 5 is substantially cylindrical and adapted to fit into the center holes 3 of the sheave sections, but has peripheral grooves 6 at the ends thereof to receive the inner edges 4 with a section of the bushing interposed between the edges of the respective sections to act as a brace therebetween and hold these securely spaced apart.

One of the sections 1 is free to turn in the groove 6, relative to the bushing 5, while the other section 1 is adapted to be keyed thereto by a notch 7, provided in the inner edge 4 of the latter section in position to engage a pin or projection 8, on the periphery of the bushing 5. This pin or projection 8 forms a key connection between the bushing 5 and the corresponding section 1.

The body sections 1 are adapted to be secured together detachably to permit assembly and disassembly of the bushing therebetween. Each section 1 has a pair of diametrically spaced slots 9, formed therein, in the form illustrated, alternating with a pair of struck-up hook-like flanges or lips 10, also diametrically spaced from each other in this embodiment, although the disposition of these parts may be varied as desired but should be symmetrically arranged around the axis of the sheave. The lips 10 on one sheave section are adapted to enter the slots 9 on the other and to interengage therewith in the manner shown in the drawings, particularly in Fig. 5, forming a bayonet joint between the sections, securely and detachably interconnecting these sections. It is thus possible to fit the two sections together in side-by-side relation, with the lips 10 on one section entering through the slots 9 on the other section, and then by rotating the sections relative to each other, to secure these in binding relation to each other.

Suitable means is provided for securing the sections against relative rotation in their adjusted positions. In the form illustrated, this is accomplished by means of a key designated generally at 11, shown in Figs. 6 and 7, and which key passes through registering holes 12 in the sections 1. The key 11 should be constructed of a suitable metal or other material which can pass through the sections and then have the ends bend over flat on the sections, as shown in Fig. 6, to anchor these securely against relative rotation.

The parts may be turned with respect to each other while the bushing 5 is interposed therebetween, because the bushing is free of one section which latter is journaled in the groove 6, although secured to the other by the pin or key 8, and notch 7, whereby the bushing will not interfere with the relative rotation of the sections and yet will be securely anchored to the sheave to rotate therewith upon the shaft or journal when the parts are assembled in Figs. 1 and 2.

It will be obvious that the bushing may be removed from the body sections merely by disconnecting the latter from each other upon removal of the key 11, and replaced by a new bushing. These parts then may be connected together again and re-used without the necessity for destroying the body whenever the bushing becomes worn.

At the same time the sheave is constructed in an inexpensive manner and forms a secure structure that may be manufactured at low cost.

While the invention has been illustrated and described in one embodiment, it is recognized that variations and changes may be made therein without departing from the invention, except as specified in the claims.

I claim:

1. A sheave comprising a plurality of body sections arranged in side-by-side relation and having central openings therein, said sections having portions thereof in abutting relation and having other portions surrounding said openings laterally flared from each other, a bushing within said central openings and having a body section in abutting relation with the portions of the body sections surrounding the openings holding said portions spaced apart, means forming a keyed connection between one of the body sections and the bushing, said body sections having outer portions coacting to form a belt receiving peripheral groove in the sheave, means forming a quick detachable connection between the body sections upon relative rotation thereof, and separate means for locking said body sections against rotation relative to each other.

2. A sheave comprising a plurality of body sections arranged in side-by-side relation and having central openings therein, said sections having portions thereof in abutting relation and having other portions surrounding said openings laterally flared from each other, a bushing within said central openings and having a body section in abutting relation with the portions of the body sections surrounding the openings holding said portions spaced apart, means forming a keyed connection between one of the body sections and the bushing, said body sections having outer portions coacting to form a belt receiving peripheral groove in the sheave, means forming a detachable connection between the body sections upon relative rotation thereof, said connection means including bayonet joint connections carried by each of the sections in interfitting engagement with the other of said body sections, and means for locking said body sections against rotation relative to each other.

3. A sheave comprising a bushing having surrounding grooves at opposite ends thereof, body sections in abutting relation with each other and having inner edge portions spaced apart and engaging the grooves in the bushing, said body sections having outer edge portions cooperating to form a sheave groove at the periphery thereof, means forming a keyed connection between the bushing and one of the sections only, each of the sections having openings therein and the other section having fingers registering with the openings in position for cooperating engagement therewith to form detachable interlocking connections between the sections upon relative rotation thereof, and a locking key extending through the body sections holding said sections against relative rotation.

4. A sheave comprising a plurality of body sections arranged in side-by-side relation and having central openings therein, said sections having portions thereof in abutting relation, and having other portions surrounding said openings laterally flared from each other, a bushing within said central openings and having a body section in abutting relation with the portions of the body sections surrounding the openings holding said portions spaced apart, means connecting one of the body sections with said bushing, and means for locking said body sections against rotation relative to each other.

BALLARD EMERSON LONG, Jr.

REFERENCES CITED

The following references are of record in the file of this patent:

UNITED STATES PATENTS

| Number | Name | Date |
|---|---|---|
| 529,919 | Kingsley | Nov. 27, 1894 |
| 801,263 | Peard | Oct. 10, 1905 |
| 885,060 | Leatherman | Apr. 21, 1908 |
| 1,414,594 | Snow | May 2, 1922 |
| 1,480,359 | Wood | Jan. 8, 1924 |
| 1,638,741 | McGinniess | Aug. 9, 1927 |
| 1,886,431 | Seelbach | Nov. 8, 1932 |